United States Patent
Haug, Jr. et al.

(10) Patent No.: US 7,925,003 B2
(45) Date of Patent: Apr. 12, 2011

(54) CALL CENTER MANAGEMENT SYSTEMS

(75) Inventors: V. Lawrence Haug, Jr., Topsfield, MA (US); Dennis H. Fieldman, Billerica, MA (US)

(73) Assignee: Castel, Inc., Beverly, MA (US)

( * ) Notice: Subject to any disclaimer, the term of this patent is extended or adjusted under 35 U.S.C. 154(b) by 1491 days.

(21) Appl. No.: 10/637,925

(22) Filed: Aug. 8, 2003

(65) Prior Publication Data

US 2005/0190908 A1    Sep. 1, 2005

Related U.S. Application Data

(63) Continuation of application No. 10/448,720, filed on May 29, 2003.

(60) Provisional application No. 60/434,925, filed on Dec. 18, 2002.

(51) Int. Cl.
*H04M 3/00* (2006.01)
*H04M 5/00* (2006.01)

(52) U.S. Cl. ......... 379/266.07; 379/265.02; 379/265.09; 379/309

(58) Field of Classification Search ............ 379/265.01–265.14, 266.01–266.1, 379/309
See application file for complete search history.

(56) References Cited

U.S. PATENT DOCUMENTS

| | | | |
|---|---|---|---|
| 4,623,761 A | 11/1986 | Winter et al. | |
| 4,697,282 A | 9/1987 | Winter et al. | |
| 4,734,930 A | 3/1988 | Quiros et al. | |
| 4,797,911 A | 1/1989 | Szlam et al. | |
| 4,881,261 A | 11/1989 | Oliphant et al. | |
| 4,894,857 A | 1/1990 | Szlam et al. | |
| 5,214,688 A | 5/1993 | Szlam et al. | |
| 5,479,487 A | 12/1995 | Hammond | |
| 5,499,289 A | 3/1996 | Bruno et al. | |
| 5,511,112 A | 4/1996 | Szlam et al. | |
| 5,555,294 A * | 9/1996 | Abe | 379/100.15 |
| 5,592,543 A | 1/1997 | Smith et al. | |
| 5,771,283 A * | 6/1998 | Chang et al. | 379/142.01 |
| 5,867,562 A | 2/1999 | Scherer | |
| 5,878,130 A | 3/1999 | Andrews et al. | |
| 5,910,983 A | 6/1999 | Dezonno et al. | |
| 5,940,393 A | 8/1999 | Duree et al. | |
| 5,963,620 A * | 10/1999 | Frankel et al. | 379/93.05 |
| RE36,416 E | 11/1999 | Szlam et al. | |
| 6,311,231 B1 | 10/2001 | Bateman et al. | |
| 6,345,094 B1 * | 2/2002 | Khan et al. | 379/266.07 |
| 6,493,446 B1 | 12/2002 | Cherry | |
| 6,587,557 B1 * | 7/2003 | Smith | 379/265.01 |

(Continued)

OTHER PUBLICATIONS

McGee-Smith Analytics, "Predictive Dialing Regulatory Requirements: Roadmap to Compliance," Jun. 2003, McGee-Smith Analytics, Pittstown, New Jersey, United States.

*Primary Examiner* — Quynh H Nguyen
(74) *Attorney, Agent, or Firm* — Ropes & Gray LLP

(57) ABSTRACT

A call center management system employs out-of-band signaling, such as provided by ISDN telecommunications technology, to manage outbound calls from a call center. By communicating with a central office of the PSTN in this way, it is possible to exercise a great degree of control over outbound calls originating from the call center. This control may be used, for example, to insert a meaningful caller identification label into the outbound call, or to manage dead air time within limits established by law, custom, or convenience, and to provide detailed reporting of outbound call activity.

20 Claims, 4 Drawing Sheets

U.S. PATENT DOCUMENTS

| | | | |
|---|---|---|---|
| 6,708,039 B2 * | 3/2004 | Harder | 455/466 |
| 6,856,618 B2 * | 2/2005 | Strathmeyer et al. | 370/356 |
| 7,012,630 B2 * | 3/2006 | Curry et al. | 348/14.08 |
| 2002/0176404 A1 | 11/2002 | Girard | |
| 2003/0007616 A1 * | 1/2003 | Alves et al. | 379/142.14 |

* cited by examiner

200

| NAME | 202 |
| --- | --- |
| NUMBER | 204 |
| ADDRESS | 206 |
| OTHER BIOGRAPHICAL | 208 |
| CALLING PARTY | 210 |
| CALLING RULES | 212 |
| OTHER CALL INFO | 214 |

FIG. 2

CASTEL INC. c 2003                                      PAGE 1
                                                        1/10/2003
                      DEAD AIR REPORT                   13:17:40

CONNECTS    ---- Dead Air (msec) ----
Project      Date                 100   200   300   400
INHOURS      12/15/02   4650      15    1200  875   825
OUTHOURS     12/15/02   1453      918   233   181   97

Project      Date      CONNECTS   500   1000  2000  OVER
INHOURS      12/15/02   4650      175   55    19    1
OUTHOURS     12/15/02   1453      16    5     3     0

* * * *  END OF REPORT  * * * * *

FIG. 4

CALL CENTER MANAGEMENT SYSTEMS

RELATED APPLICATIONS

This application is a continuation of U.S. patent application Ser. No. 10/448,720, filed May 29, 2003, which claims the benefit of U.S. Prov. App. No. 60/434,925, filed Dec. 18, 2002. The teachings of those applications are incorporated herein by reference.

BACKGROUND OF THE INVENTION

Call centers have been used for decades to centralize the process of calling a number of related parties from a centralized physical location where a number of telephone agents work, or to handle incoming calls where a large volume of calls is expected. In order to assist call center agents, a number of technologies have been developed to assist in the operation and management of these call centers. This includes automated dialers that place outgoing calls using records retrieved from a database, as well as software to distribute information about each called party or incoming calling party for display at work stations where agents are located.

The growth in telemarketing and other applications for outbound call centers has created a need for more careful management of each call. For example, anyone who has received a call from a busy call center will recognize the tell tale "dead air" pause between their greeting (such as "hello") and a response from an agent. During this time, the call center searches for an available agent to connect to the called party. There may also be difficulties for the called party when dial tone is not returned to the called party's telephone, which can prevent the called party from placing outbound calls for an extended time, even after the telephone has been hung up. In addition to creating a nuisance for called parties, these inefficiencies in conventional call centers can create cost and inconvenience for call centers and commercial providers within the Public Switched Telephone Network ("PSTN").

While the Integrated Services Digital Network ("ISDN") standard provides one established technique for connecting a call center to the PSTN, it has been widely ignored in call centers that make outbound calls. Generally, outbound call centers employ the cheaper and technologically simpler analog dialing alternatives, where digital signal processing is coupled with legacy local loop electronics to dial outbound calls and analyze in-band audio signals to detect the presence of a person at the receiving terminal. As a significant disadvantage, these local loop systems rely on in-band control signaling for operations such as dialing, on-hook detection, and off-hook detection. As a further disadvantage, they cannot independently control, for example, call tear down or the caller identification associated with an outbound call. These latter functions are under control of the PSTN core that interconnects central offices. While it is possible to send control messages to a central office concerning any of these telephone functions, it is not possible to do so using local loop, in-band signaling.

There remains a need for a system that brings the capabilities of out-of-band signaling to bear on managing the dead air and other inconveniences otherwise associated with analog-based call centers.

SUMMARY OF THE INVENTION

A call center management system employs out-of-band signaling, such as provided by ISDN telecommunications technology, to manage outbound calls from a call center. By communicating with a central office of the PSTN in this way, it is possible to exercise a great degree of control over outbound calls originating from the call center. This control may be used, for example, to insert a meaningful caller identification label into the outbound call, or to manage dead air time within limits established by law, custom, or convenience, and to provide detailed reporting of outbound call activity.

BRIEF DESCRIPTION OF DRAWINGS

The foregoing and other objects and advantages of the invention will be appreciated more fully from the following further description thereof, with reference to the accompanying drawings, wherein:

FIG. 2 is a data structure for storing data in a database at the call center;

FIG. 4 shows a report that may be generated for the call center.

DETAILED DESCRIPTION OF THE PREFERRED EMBODIMENT(S)

To provide an overall understanding of the invention, certain illustrative embodiments will now be described, including a call center system for automatically generating outbound calls to a central office using ISDN. However, it will be understood that the systems and methods described herein may be usefully applied to a number of telecommunications systems, such as a call center using the out-of-band signaling provided by Global System for Mobile Communications ("GSM"), Voice Over Internet Protocol ("VoIP") or Signaling System 7 ("SS7") technology, and to different telecommunications devices, such as a device for dynamically inserting caller identification information into outbound calls.

Figure 1:
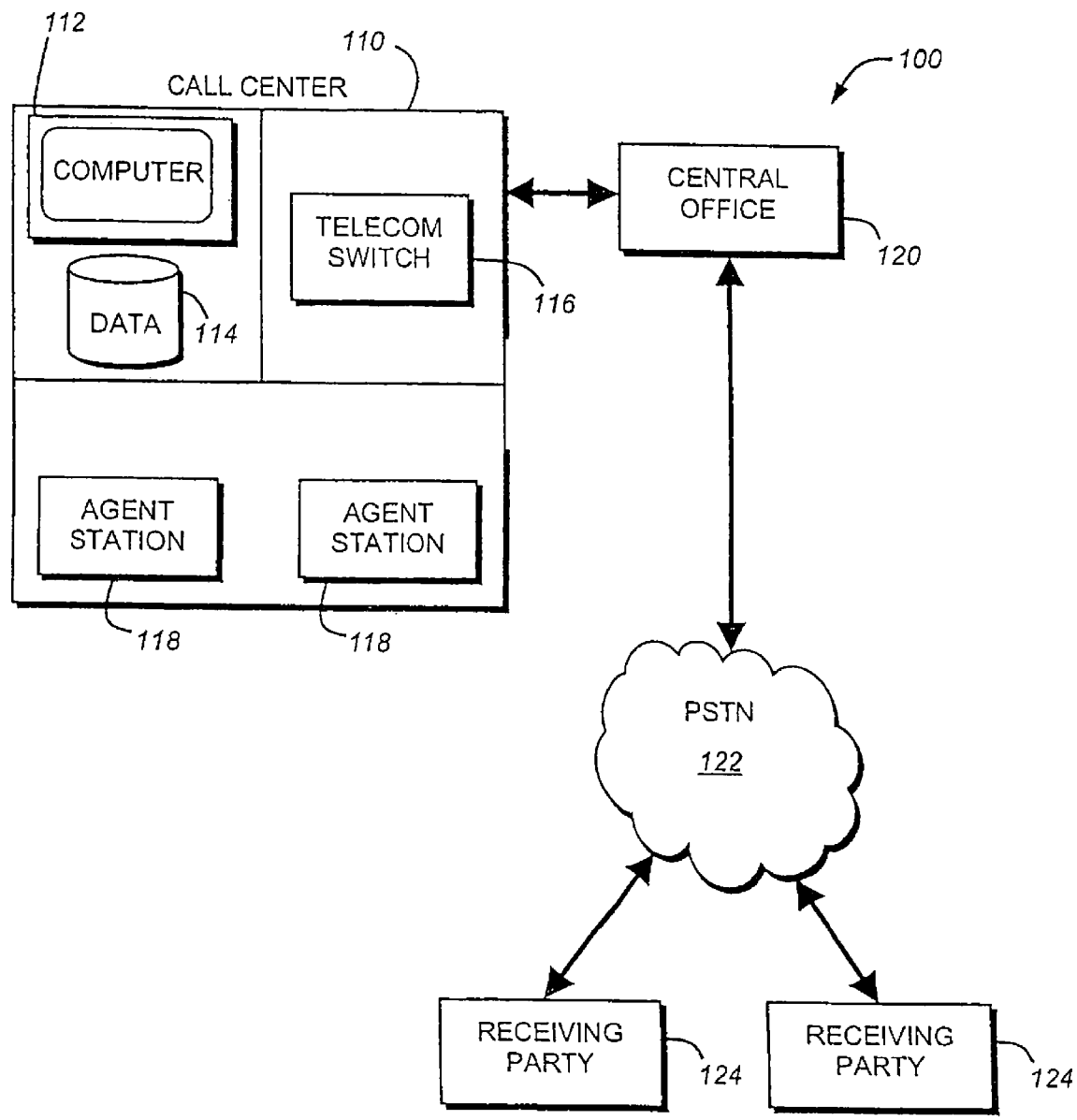
FIG. 1 depicts a telecommunications system including a call center.

FIG. 1 depicts a telecommunications system including a call center. The telecommunications system 100 includes a call center 110 with a computer 112, a database 114, and a telecommunications switch 116 that interconnects a plurality of agent stations 118 to a central office 120. The central office 120 controls calls through a Public Switched Telephone Network ("PSTN") 122 to one or more receiving parties 124.

The call center 110 may include a building or other structure for housing agents (not shown) who work at the agent stations 118. Optionally, the call center 110 may be a virtual call center 110 in which remote agent stations 118 are connected through a private or public network to the telecommunications switch 116, the computer 112, and the database 114.

The computer 112 may be any computer suited in processing capability and fault tolerance to control the telecommunications switch 116 while communicating with the database 114 and the agent stations 118 to match inbound and outbound calls with agents. In general, the computer 112 reads a record from the database 114 to initiate an outbound call and to present data about the receiving party 124 to a display (not shown) at one of the agent stations 118. Any wireless or wired local area network ("LAN") connection or other communication medium may be used to transfer data and commands between the agent stations 118 and the computer 112 and the database 114. The computer 112 may also monitor the progress of calls and manage incoming calls to the call center 110. In addition, the computer 112 may execute, or communicate with, one or more business-aware processes executing at the call center 110 to control overall management of the call center 110. One suitable computer for use with the system described herein is an IBM AS/400.

The database 114 may be any database having suitable capacity and speed to provide timely call data to the call center 110. This may include a database or other storage system locally associated with the computer 112, or an external database or database service suitable for use with the computer 112. The data structure of records stored in the database 114 is described in greater detail below. The database 114 may also include one or more pre-recorded messages that may be used interactively or as announcements by the call center 110. In this sense, the database 114 may be considered to include any analog or digital form of voice storage used for pre-recorded messages, such as cassette tapes. Voice synthesis may also, or instead, be used.

The telecommunications switch 116 may be any switch or other device capable of creating connections between the central office 120 and the agent stations 118. The telecommunications switch 116 may communicate voice or in-band signals with the central office 120, through which channels telephone conversations are conducted, as well as command or out-of-band signals through which status and command information are exchanged between the telecommunications switch 116 and the central office 120. The telecommunications switch 116 may include one or more private branch exchanges. Suitable telecommunications switches for use with the systems described herein include an Avaya G3 switch or a Cisco VCO Switch.

Each agent station 118 includes a telephone connected to the telecommunications switch 116 and a display connected to the computer 112 for use by an agent. The agent stations 118 may also include cubicles, desks, chairs, drawers, file cabinets, or other items for use by agents working at the agent stations 118.

The central office 120 serves as an interface to the PSTN 122. The central office 120 is a telecommunications office that handles the telephone service for a particular locality. Telephone lines from the central office 120 may carry local loop analog traffic as well as ISDN signals and other signals such as Digital Subscriber Line ("DSL") broadband connections. It will be appreciated that while ISDN is one standard that may be used for digital telephonic communications as described herein, other standards are used in other countries or with different transmission media. Digital standards such as E1, T1, or any Digital Subscriber Line ("xDSL") standard, as well as cable telephony standards such as Data Over Cable Service Interface Specification ("DOCSIS"), may be used to carry voice traffic as described herein.

The ISDN standard is now described in more detail. The ISDN standard is an international communications standard for sending voice, video, and data over digital telephone lines or normal telephone wires. There are two types of ISDN. Basic Rate ("BRI") ISDN consists of two 64-Kbps B-channels and one D-channel for transmitting control information. Primary Rate ISDN consists of 23 B-channels and one D-channel (U.S.) or 30 B-channels and one D-channel (in Europe). The original version of ISDN employs baseband transmission. There is another version of ISDN, B-ISDN, that uses broadband transmission and is able to support transmission rates of 1.5 Mbps. This standard is established but not widely used or available. The B-channel, short for Bearer-channel, carries voice traffic when used for telephonic communications. The D-channel, short for Data-channel, carries control and signaling information.

The hardware for use with an ISDN-based system and the protocols for communicating control and status information in an ISDN-based system are well known in the art, and it is not necessary or helpful to repeat them here. For the purposes of this description, it will suffice to describe several messages that may be used within the out-of band D-channel of an ISDN system.

A call origination message may be used to request that the central office 120 initiate a call through the PSTN 122. This message may include the request to initiate the call, as well as the telephone number of the receiving party 124 that is to receive the call and a caller identification, typically used to provide the telephone number of the calling party (although other uses may be made of this field, as described below).

An off-hook message may be transmitted from the central office 120 to the call center 110 that originated the call. This message may include data provided by another central office (using, e.g., SS7) through which the receiving party 124 connects to the PSTN 122. The message may include an acknowledgement that the call has been answered by the receiving party 124, as well as a time stamp indicating when the receiving party 124 telephone went off-hook.

An on-hook message may be transmitted from the central office 120 to the call center 110 that originated the call. This message may include data provided by another central office (using, e.g., SS7) through which the receiving party 124 connects to the PSTN 122. The message may include an indication that the call has been terminated by the receiving party 124, as well as a time stamp indicating when the receiving party 124 telephone went on-hook.

A call tear down message may be used to request that the central office 120 terminate a call through the PSTN 122 and return a open line (or dial tone) to the receiving party 124 for a call. This message may include the request to terminate the call, as well as the telephone number of the receiving party 124 that received the call.

The receiving party 124 is any telecommunications device that might be connected to calls to and from the call center 110. This includes telephones, cellular phones, facsimile machines, answering machines, and so forth. It will be appreciated that, as used herein, the term "receiving party" may refer to one of the above devices, or to a person using one of the devices for telephonic communications.

Operation of the system is now described in general terms. Using the information from the database 114, the computer 112 may provide commands to the telecommunications switch 116, to which the computer 112 may be connected through a local area network ("LAN") or other communications medium. The commands may be in any form suitable for processing by the telecommunications switch 116. Pursuant to the local commands from the computer 112, the telecommunications switch 116 may issue an ISDN command to the central office 120 to place a call to a receiving party 124 indicated by the record. When the receiving party 124 answers the call, an off-hook signal is communicated through the PSTN 122 to the central office 120, and from the central office 120 to the telecommunications switch 116 through a signaling channel such as an out-of-band ISDN message. This message may be forwarded to the computer 112 for subsequent processing.

At some time during this call origination process, a call is connected to the receiving party 124 and to an agent at one of the agent stations 118 (or to an agent proxy such as a pre-recorded message). The computer 112 may provide data concerning the receiving party 124 to the agent station 118 of the agent handling the call, so that the agent can have a display of any information relevant to handling the call. In general, a new agent enters the system by registering at one of the agent stations 118, such as through a login procedure. The computer 112 manages allocation of a pool of available agents, and may pace outbound calls so that an agent is available whenever an answer is received from one of the receiving parties 124. It will be appreciated that a number of pacing algorithms are known in the art and used in call centers to time the placement of outbound calls consistent with available agents. Any such pacing algorithm or algorithms may be used with the systems described herein, and the details of such pacing algorithms are not important to the claimed invention. When an agent station 118 is not available for an outbound call that has been answered, the computer 112 may tear down the call (through appropriate commands to the telecommunications switch 116 and central office 120) before some predetermined amount of time has passed. Operation of the call center 110 in this and other respects is described in greater detail below.

Each call that is conducted between an agent at an agent station 118 and a called party at a receiving party 124 device may include a dialogue between the parties concerning some business as indicated in data for the outbound call. The agent may update information through the agent station 118, or provide information to the called party, or some combination of these, resulting in a conclusion of the call, at which time both parties may hang up.

FIG. 2 is a data structure for storing data in a database at the call center. The data structure 200 may be for a record in a database that includes fields for a name 202, one or more numbers 204, one or more addresses 206, other biographical data 208, a calling party 210, calling rules 212, and other call information 214. It will be appreciated that the order of these fields is of no significance, and that other fields may be included in a record in addition to the data described herein, as necessary or helpful to the operation of a call center.

The name 202 includes a name of a person or other entity that is to be called at the receiving party 124 associated with the number 204.

The number 204 includes a telephone number for calling the receiving party 124 through the PSTN.

The address 206 may include one or more entries for an address of the receiving party 124 or a person or other entity associated therewith. This may include, for example, a post office box, a street address, an apartment or suite number, a town, a state, a zip code, and any other information useful for specifying an address.

The other biographical data 208 may include any descriptive data suitable for the purposes of a call, such as age, birth date, social security number, sex, height, weight, income, family status, hobbies, interests, educational background, account information, and/or any other information.

The calling party 210 may include a numeric or alphanumeric identifier of a source of the call. The calling party 210 may include an Automatic Number Identification ("ANI"), familiar to telephone users as the vernacular "Caller ID" that identifies a source of a telephone call. The source may be, for example, a party who operates the call center 120, or any third party associated with an outbound call, such as a customer of the call center 120 who engages the services of the call center 120 to place one or more calls. In such third-party cases, the identifier may include a telephone number by which the third party may be contacted. It is also possible to include a text identifier such as the name of a calling party, although at present this service is not commonly used with outbound calls from call centers.

The calling party 210 identifier may be included with a call origination message to the central office 120, so that it appears as the caller on any device with caller ID service and capability. Using this data, a caller identification may be dynamically assigned to each outbound call according to data in the calling party 210 of a record, and may identify the caller in some meaningful way to the receiving party 124. Thus the call center 110 may present a different caller ID to different receiving parties 124 according to the purpose of each call, and agents may be dynamically assigned to different calls or call campaigns as appropriate while remaining compliant with any applicable rules or regulations requiring use of caller ID with outbound calls.

The calling rules 212 may specify one or more rules applicable to an outbound call. For example, a call to a certain state may require a specific type of caller identification to be included in a call. Another state may establish a maximum allowable period of dead air between a verbal answer by a receiving party and a response by, or connection to, a live agent. Even without mandated rules, a call center may apply certain rules to telephone calls according to desired practices of the call center or a customer of the call center. These rules may be included symbolically in the calling rules 212 so that they may be queried, interpreted, and applied automatically by the call center. In another embodiment of the systems described herein, calling rules may be inferred from the number 204 or the address 206 of the called party, either through a geographic look-up table of current rules for different regions that is applied when each call is made, or through a program that examines each record when it is created and stores any applicable rules in the calling rules 212 field.

Other call information 214 may include any other information helpful to an agent handling an outbound call or applicable to a called party, such as account balances, account transaction history, payments, product orders, shipping and fulfillment information, and so forth. This may also include, for example, a description of a customer question or complaint that is to be handled by an agent from the call center.

An agent may have read/write access to each record or a portion thereof, such as other call information 214, so that the record can be updated while a call is in progress.

Figure 3:
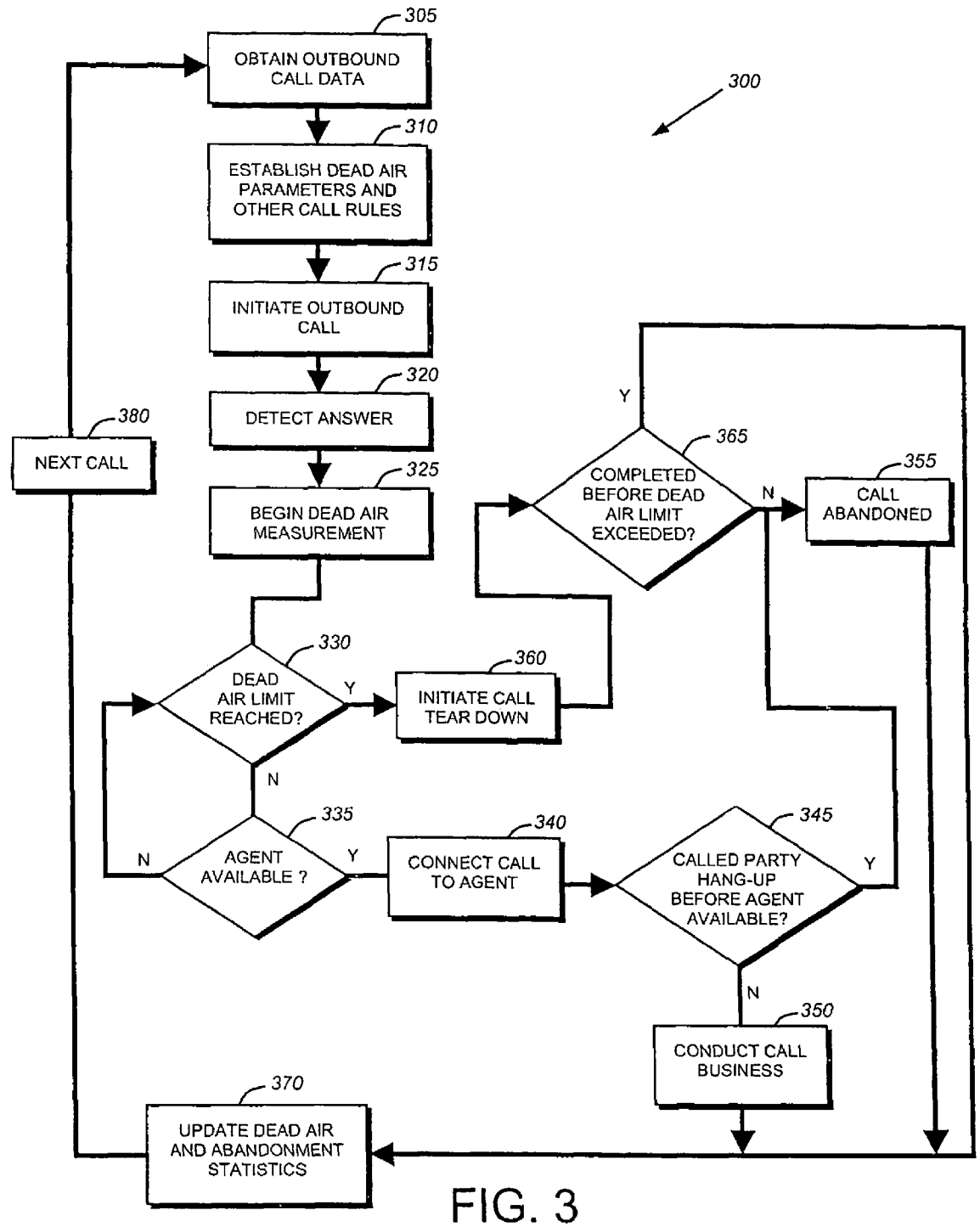
FIG. 3 is a flow chart showing operation of the call center.

FIG. 3 depicts a process for managing a call center. It will be appreciated that the process 300, and the call center 110 generally, may be realized in hardware, software, or some combination of these, provided connections are included for the agent stations and the central office. The process 300 may be realized in one or more microprocessors, microcontrollers, embedded microcontrollers, programmable digital signal processors or other programmable device, along with internal and/or external memory such as read-only memory, programmable read-only memory, electronically erasable programmable read-only memory, random access memory, dynamic random access memory, double data rate random access memory, Rambus direct random access memory, flash memory, or any other volatile or non-volatile memory for storing program instructions, program data, and program output or other intermediate or final results.

Any combination of the above circuits and components, whether packaged discretely, as a chip, as a chipset, or as a die, may be suitably adapted to use with the systems described herein. It will further be appreciated that the above process 300 and call center 110 may be realized as computer executable code created using a structured programming language such as C, an object oriented programming language such as C++, or any other high-level or low-level programming language that may be compiled or interpreted to run on one of the above devices, as well as heterogeneous combinations of processors, processor architectures, or combinations of different hardware and software. Finally, while the process 300 is depicted as a single flow of steps, it will be appreciated that any number of similar or identical processes may be executed in parallel, according to the call volume of the call center and the capabilities of the computer(s) that manage operation of the call center.

The process 300 may begin by obtaining outbound call data, as depicted in step 305. This may include retrieving the records described above from a database. This may also, or instead, include receiving call data from a queue of outbound calls. The queue may be provided as messages or commands from a computer within the call center, or may be provided to the call center from a remote data source. In this manner, third parties may provide a calling queue to the call center of calls to be serviced by agents at the call center.

Once outbound call data has been obtained, one or more dead air parameters may be established, as shown in step 310. Dead air parameters may be, for example, definitions of when a dead air measurement should begin and end, and a maximum allowable dead air duration for an outbound call from the call center to the receiving party. These parameters may be determined, for example, by reading dead air rules directly from a record for the outbound call. This may also, or instead, be accomplished by drawing inferences from called party geographic information such as a telephone number or address. This may include analyzing one or more digits of a telephone number for the outbound call. Or a look-up table may be provided in which a called party's location is mapped to one or more dead air parameters. Thus, while not explicitly shown in FIG. 3, it will be appreciated that the process 300 may include an interim step of determining a location of a called party, such as by using address or telephone information as suggested above, and applying the location to determine applicable calling rules. In addition to rules concerning dead air, it will also be appreciated that other rules applicable to the call, such as abandonment or caller identification rules, may be similarly applied.

As shown in step 315, once call rules have been established, an outbound call may be initiated. Where the call rule relates to, for example, including a caller identification, there may be an additional step (not shown) of retrieving caller identification data for the call. An outbound call may be initiated by directing a telecommunications switch at the call center to send an out-of-band message to a central office connected to the call center. This message may be, for example, the call origination message described above, and may include caller identification information.

Once an outbound call has been initiated, the process 300 may proceed to detect an answer, as shown in step 320. This may be, for example, the off-hook message described above, and it may include a time stamp indicating when the receiving party went off-hook.

Once the receiving party is off-hook, a dead air measurement may begin, as shown in step 325. Dead air may be defined and measured in a number of different ways, with specific rules being optionally provided in the outbound call record as described above. For example, dead air may begin when a greeting by the receiving party ends. In this case, some form of digital signal processing may be provided by the call center to analyze in-band voice signals for the beginning and end of a called party greeting. Dead air may instead begin when the receiving party telephone goes off-hook. Although not a presently preferred embodiment, dead air may also begin when the call outbound call is initiated, in which case ring time would be included in a dead air measurement. Dead air for an outbound call may end when an agent (or an agent proxy such as a pre-recorded message) replies to a greeting from the receiving party. Or dead air may end when the receiving party disconnects the outbound call. Dead air may instead end when dial tone is returned to the receiving party after call termination (by either party). Dead air may be measured in whole or in part using time information included in out-of-band messages. It will also be appreciated that this dead air "measurement" may be calculated or measured continuously or at discrete intervals, according to the hardware and software within the call center performing the measurement.

When a dead air measurement has begun, the dead air measurement may be checked to determine whether a dead air limit established by the call rules (from step 310) has been reached, as shown in step 330. If the dead air limit has not been reached, the process 300 may proceed to step 335 where the process 300 may check to see whether an agent is available for the connected call. If no agent is available, the process 300 may return to step 330 where dead air may be checked again. If an agent is available, the call may be connected to the available agent, as shown in step 340.

After a call has been connected to an agent, the process 300 may determine whether the called party has hung up before the agent was connected to the call, as shown in step 345. A called party hang up may be detected, for example, by detecting an on-hook message from the central office 120 to the call center 110 that originated the call. This message may include data provided by another central office (using, e.g., SS7), including an indication that the call has been terminated by the receiving party 124, as well as a time stamp indicating when the receiving party 124 telephone went on-hook.

If the called party has not hung up, the agent and the called party may conduct the business related to the call, as indicated in step 350. If the called party has hung up before the agent was connected to the call, then the call may be considered "abandoned", depending on the applicable rules determined in step 310. In one embodiment, an abandonment occurs when a dead air time for one of the outbound calls exceeds a predetermined time period. In another embodiment, an abandonment occurs when one of the outbound calls is disconnected before the outbound call is connected to an agent. Optionally both of these, and/or other events may be considered call abandonments.

Returning to step 330, if the dead air limit is reached for a call, the process 300 may initiate a tear down of the call, as shown in step 360. This may be accomplished, for example, using the call tear down message to request that the central office 120 terminate a call and return an open line (or dial tone) to the called party.

In an optional embodiment, an agent proxy, such as a pre-recorded message, may be provided when the dead air limit is about to be reached an no agent is available. It will further be appreciated that initiating new outbound calls (step 315) may be paced to reduce or eliminate the possibility of having no agent to field a connected call. In another optional embodiment, only agent proxies may be used for a particular call type. As with call rules, this information may be stored in a record associated with the call. In another optional embodiment, an agent may be connected to a call even after the dead air time has been exceeded, with a record stored of the outbound call as a dead-air-time-exceeded call.

As shown in step 365, the process 300 may then check to determine whether the call was successfully taken down before the dead air limit was exceeded. If the tear down was not completed in time, then the call is "abandoned", as shown in step 355.

If the call was taken down before the dead air limit was exceeded, then the process 300 may update dead air and abandonment statistics for the call as appropriate, as shown in step 370, and proceed to the next call, as shown in step 380. Similarly, if a called party has hung up before an agent is available in step 345, the call is "abandoned" as shown in step 355 and the process 300 may proceed to update dead air and abandonment statistics for the call as appropriate, as shown in step 370, and proceed to a next call, as shown in step 380. It will be appreciated that whether any particular call is abandoned, and the amount of dead air for each call, will depend on rules applicable to a call, and as such, may vary from call to call as described above. In step 380, a next call is initiated by returning to step 305 and obtaining new outbound call data.

It will be appreciated that many steps of the process 300 may be implemented using a number of different hardware and software designs. For example, steps 325-340 may be realized as an interrupt-driven state machine (i.e., where an "agent available" signal interrupts a dead air limit routine) or a program loop, or using some other technique. In addition, the order of some of the steps is arbitrary. For example, a next call (step 380) may be initiated before statistics have been updated (step 370). All such embodiments are intended to fall within the scope of this disclosure.

FIG. 4 shows a report that may be generated for the call center. It will be appreciated that a number of useful reports may be generated from the data collected in step 370. For example, a summary report of dead air for all outbound calls from a call center may be generated. Optionally, the dead air report may itemize dead air statistics for each agent associated with the call center. Similarly, a summary report of abandonment may be generated showing one or more abandonment statistics for the call center, or for a calling campaign from the call center. A campaign or calling campaign, is any group of outbound calls having a common origin, which may be particular customer of the call center, or a particular informational campaign, sales or marketing campaign, promotional campaign, political campaign, fundraising campaign or other effort that can be usefully undertaken from a call center. A campaign may, for example, identify particular customers eligible for a sales offer, voters with a known political affiliation, people who have expressed an interest in some subject matter, or any other individuals fitting a description to which the campaign may be applicable.

As shown in FIG. 4, a report 400 may include descriptive data 402, company identification 404, and a title 406, as well as tabulated data including a project name 408, a date 410, connects 412, and dead air time 414.

The descriptive data 402 may include any data about the report, such as a page number, a date, and a time. The company identification 404 may include a name of a company running the call center or generating the reports, and may include a statement of copyright or other proprietary interests in the report 400 or the data contained therein. The title 406 may be user-provided, or automatically provided by the system, and may describe the contents of the report. While the report 400 depicted in FIG. 4 is a "Dead Air Report", it will be appreciated that other reports may be generated with other titles, such as "Abandoned Calls" or "Call Length", and may be sorted by calling campaign, by agent, or by any available data concerning called parties.

The tabulated data, may include a project name 408, such as the name of a particular calling campaign, or the name of a particular call center customer. A customer or call campaign associated with the project name 408 may be further divided into inbound and outbound call data, depicted in FIG. 4 as rows labeled "INHOURS" and "OUTHOURS" respectively. The date 410 may be a date upon which the data was collected, and is distinguished from the date in the descriptive data 402, which would typically be the date on which the report 400 is generated. The connects 412 may include, for each row, data corresponding to a number of calls, inbound or outbound. Other data, such as inbound or outbound minutes, may also be gathered and provided in another column.

Dead air time 414 shows a number of connects 412 corresponding to each one of a number of ranges of dead air. For example, as depicted in FIG. 4, a first column of dead air time 414 is labeled "100", and shows a number of calls (for inbound and outbound calls, separately) having dead air time of one hundred milliseconds or less. A next adjacent column of dead air time 414 is labeled "200", and corresponds to a number of calls having dead air time in the adjacent range of more than one hundred milliseconds up to two hundred milliseconds. A number of calls in each range of dead air time 414 may be provided, with an open ended final range of over two thousand milliseconds. It will be appreciated that these ranges are exemplary only, and that other ranges may be provided according to convenience, customer requirements, or legal requirements.

The end of the report 400 may be prominently demarked, so that numerous reports may be aggregated on a single print out or other medium.

The report may be rendered in printed form or on a computer screen, and an interface may be provided for querying underlying data to generate reports covering different statistics, data sources, campaigns, time periods or ranges, dead air durations, and so forth. Thus, while an example report is provided for purposes of illustration, it will be appreciated that a wide range of reports are contemplated by this disclosure, and may be generated by the systems described herein.

While the invention has been disclosed in connection with the preferred embodiments shown and described in detail, it will be understood that the invention is not to be limited to the embodiments disclosed herein, but is to be understood from the following claims, which are to be interpreted as broadly as allowed under the law.

What is claimed is:

1. A method for managing caller identification of a calling party in outbound telephone calls comprising:
    obtaining a record for an outbound call to be made from a call center for the calling party to a receiving party, the record including calling rules associated with the receiving party and a caller identifier for transmission to the receiving party in the outbound call as an identifier of the calling party;
    assigning the caller identifier based, at least in part, on the calling rules;
    transmitting an out-of-band message to initiate the outbound call, the out-of-band message including a telephone number used to connect to the receiving party through a telecommunications network, and the message including the caller identifier for transmission to the receiving party;
    receiving at the call center an out-of-band message that the outbound call has been answered; and
    connecting an agent to the outbound call.

2. The method of claim 1, wherein the caller identifier includes at least one of a numeric and alphanumeric identifier.

3. The method of claim 1, wherein the caller identifier includes an automatic number identification (ANI).

4. The method of claim 1, wherein the calling party includes the party who operates the call center.

5. The method of claim 1, wherein the calling party includes a customer of the call center who engages the call center to place the outbound call.

6. The method of claim 1, wherein the caller identifier includes a text identifier of the calling party.

7. The method of claim 1, wherein the out-of-band message includes an ISDN message.

8. The method of claim 1 comprising communicating the out-of-band message using at least one of DOCSIS, GSM, VOIP, and SS7 signaling.

9. The method of claim 1, wherein the calling rules include rules associated with a geographic region, the geographic region being associated with at least one of the telephone number and address of the receiving party.

10. The method of claim 1, wherein the calling rules are based, at least in part, on at least one of rules mandated by the geographic region and rules required by the call center.

11. A system for managing caller identification of a calling party in outbound telephone calls from a call center comprising:
- a plurality of agent stations, each agent station including a display and a telephone;
- a telecommunications switch coupled to the telephone at each one of the plurality of agent stations, the telecommunications switch also coupled in a communicating relationship with a central office, the communicating relationship including one or more voice channels and one or more signaling channels;
- a database of records corresponding to outbound calls that are to be placed and at least one caller identifier; and
- a computer configured to i) obtain a record from the database for an outbound call to be made from the call center for the calling party to a receiving party, the record including calling rules associated with the receiving party and the at least one caller identifier for transmission to the receiving party in the outbound call as an identifier of the calling party, ii) assign the at least one caller identifier based, at least in part, on the calling rules, iii) transmit an out-of-band message to initiate the outbound call, the out-of-band message including a telephone number used to connect to the receiving party through a telecommunications network, and the message including the at least one caller identifier for transmission to the receiving party, iv) receive at the call center an out-of-band message that the outbound call has been answered, and v) connect an agent station to the outbound call.

12. The system of claim 11, wherein the caller identifier includes at least one of a numeric and alphanumeric identifier.

13. The system of claim 11, wherein the caller identifier includes an automatic number identification (ANI).

14. The system of claim 11, wherein the calling party includes the party who operates the call center.

15. The system of claim 11, wherein the calling party includes a customer of the call center who engages the call center to place the outbound call.

16. The system of claim 11, wherein the caller identifier includes a text identifier of the calling party.

17. The system of claim 11, wherein the out of band message includes an ISDN message.

18. The system of claim 11, wherein the out-of-band message is communicated via at least one of DOCSIS, GSM, VOIP, and SS7 signaling.

19. The system of claim 11, wherein the calling rules include rules associated with a geographic region, the geographic region being associated with at least one of the telephone number and address of the receiving party.

20. The system of claim 11, wherein the calling rules are based, at least in part, on at least one of rules mandated by the geographic region and rules required by the call center.

* * * * *